United States Patent [19]

Chang et al.

[11] 4,348,360

[45] Sep. 7, 1982

[54] CATALYTIC CONVERTER FOR OZONE REMOVAL IN AIRCRAFT

[75] Inventors: Jeffrey C. Chang, Woodbury; Arthur W. Pluim, Jr., Stillwater, both of Minn.

[73] Assignee: Minnesota Mining and Manufacturing Company, St. Paul, Minn.

[21] Appl. No.: 91,139

[22] Filed: Nov. 5, 1979

[51] Int. Cl.³ .......................... A62B 7/08; B32B 3/04; B01J 8/02

[52] U.S. Cl. .................... 422/122; 422/180; 422/190; 422/222; 428/116; 428/118; 55/491; 55/489

[58] Field of Search ............... 422/120, 122, 180, 190, 422/222, 220, 176, 177; 423/219; 428/116, 118; 55/485, 323, 325, 489, 501, 491, 492

[56] References Cited

U.S. PATENT DOCUMENTS

| Re. 27,747 | 9/1973 | Johnson | 165/166 |
|---|---|---|---|
| 2,298,607 | 10/1942 | Anderson | 423/210 |
| 3,190,057 | 6/1965 | Sinex | 55/501 |
| 3,255,027 | 6/1966 | Talsma | 106/65 |
| 3,269,801 | 8/1966 | Boberg et al. | 422/180 |
| 3,473,938 | 10/1969 | Oberlin | 106/57 |
| 3,473,987 | 10/1969 | Sowards | 156/89 |
| 3,554,929 | 1/1971 | Aarons | 252/462 |
| 3,682,585 | 8/1972 | Frevel et al. | 423/219 |
| 3,727,384 | 4/1973 | Feldman | 55/489 |
| 3,799,796 | 3/1974 | Hunter | 252/455 R |
| 3,887,740 | 6/1975 | Foster et al. | 428/116 |
| 3,891,575 | 6/1975 | Bräutigan | 422/180 |
| 3,905,775 | 9/1975 | Sowards et al. | 422/180 |
| 3,950,157 | 4/1976 | Matney | 55/491 |
| 4,072,471 | 2/1978 | Morgan, Jr. et al. | 422/180 |

FOREIGN PATENT DOCUMENTS 2009392 6/1979 United Kingdom .

OTHER PUBLICATIONS

42 Federal Register 194, 544427-544428 (Oct. 6, 1977).
Aluminum Honeycomb Core Products, Cyanamid Company, Havre de Grace, MD.
Boeing Co. Specification Control Drawing No. SCD-60B10057.
Hexiel Corp. Bulletin D.S. 2100, Mar. 15, 1977.

Primary Examiner—William F. Smith
Assistant Examiner—Chris Konkol
Attorney, Agent, or Firm—Cruzan Alexander; Donald M. Sell; David R. Cleveland

[57] ABSTRACT

A cartridge for a catalytic ozone converter comprising an aluminum honeycomb core, a tubular metal shell surrounding the core and affixed thereto, metal rib support members fastened to the shell and to the honeycomb core, and a catalytic coating deposited upon the cell walls of the honeycomb core.

13 Claims, 7 Drawing Figures

CATALYTIC CONVERTER FOR OZONE REMOVAL IN AIRCRAFT

This invention relates to catalytic converters for ozone removal in aircraft. The invention also relates to a strengthened aluminum honeycomb useful as a catalytic substrate.

Ozone found in air at high altitudes has been recognized as a health hazard and source of discomfort for crew members and passengers of commercial aircraft, see Advance Notice of Proposed Rulemaking, 42 Federal Register 194, 54427-28 (Oct. 6, 1977). In aircraft, ozone removal is generally accomplished by passing a stream of air through a bed of carbon granules. Airframe manufacturers have proposed that a catalytic converter be used for deozonification instead of a bed of carbon granules. The proposed requirements for such a catalytic converter are long life, low weight, low pressure drop, high efficiency, and the ability to withstand high air flow rates, vibration, thermal transients, and impacts from foreign objects (e.g., loosened aircraft hardware) carried in the air stream, see Boeing Co. specification for catalytic ozone converter No. SCD-60B10057, dated Aug. 24, 1979.

Catalytic converters for ozone removal having substrates made from fibers, pellets, or particles which are metallic or a metal coated ceramic material, have been described for use in aircraft in U.S. Pat. No. 3,269,801 and in U.K published patent application No. 2,009,392 A. Also, glass wool and gamma alumina granules have been described as catalytic substrates for stationary (ground-based) deozonification in U.S. Pat. Nos. 2,298,607 and 3,682,585. Ceramic substrates prepared according to the method of U.S. Pat. No. Re. 27,747 have been experimentally used by Lockheed Aircraft Co. for aircraft deozonification. However, the various substrates described above have the disadvantages of, for example, high weight, high pressure drop, and fragility.

Modified aluminum honeycomb has been described as a catalytic substrate useful, for example, in catalytic converters which remove pollutants from the exhaust of internal combustion engines; see U.S. Pat. Nos. 3,255,027, 3,473,938, 3,473,987, 3,554,929, 3,799,796, and 3,887,740. These patents have disclosed means for converting aluminum honeycomb into a ceramic catalytic substrate. In general, the methods of these patents have involved placing a thick coating of alumina on the surface of aluminum honeycomb by dipping the honeycomb in an alumina slurry. The coated honeycomb is then heated to melt and oxidize the aluminum honeycomb and to dry and calcine the alumina. The resulting structure is wholly or largely alumina, a ceramic. Formation of an alumina honeycomb increases the bulk density of the catalytic substrate, thereby increasing its weight and pressure drop, as well as increasing the fragility of the substrate upon exposure to mechanical and thermal shock.

Aluminum honeycomb has been used as a structural element in aircraft, for example as a strengthening member in aircraft wings. However, aluminum honeycomb has not hitherto been used as a catalytic substrate for reducing the concentration of ozone in aircraft.

It is an object of the present invention to provide a reinforced aluminum honeycomb structural unit useful as a catalytic substrate. It is also an object of the present invention to provide a lightweight catalytic converter with high surface area to weight (or volume) ratio and low resistance to air flow. Another object of the present invention is to provide a catalytic substrate with high thermal conductivity, long life, and good resistance to high air flow rates, vibration, thermal transients, and impacts from foreign objects. It is a further object of the present invention to provide a catalytic substrate for reducing the concentration of ozone in air such as in the cabin of an aircraft which encounters ozone-laden air at high altitudes.

The present invention provides, in one aspect, a lightweight, unified, monolithic aluminum honeycomb structural unit, having metal rib support members which provide the unit with resistance to high airflow rates and impact from foreign objects (such as loose aircraft bolts) which otherwise might cause catastrophic collapse of the unit. In a preferred embodiment of this invention, said structural unit is in the form of a cartridge useful as a catalytic ozone converter, said cartridge comprising:

(a) an aluminum honeycomb core consisting essentially of a plurality of corrugated aluminum sheets bonded together at their contiguous points of contact (i.e., "nodes") to define a plurality of longitudinally aligned, thin-walled passages in the form of regularly repeating cells of such dimensions as to ensure turbulent flow of air therethrough;

(b) a tubular metal shell surrounding the outer wall of said core and affixed thereto;

(c) one or more metal rib support members each fastened at its two ends to said shell and fastened along its length to said core so as to transversely intersect a plurality of said nodes; and (d) a layer of catalytic material deposited on the walls of said cells to form a catalytic surface for reaction with fluid (e.g., ozone-laden air such as encountered by aircraft) entering one end of said cells, passing through said cells, and exiting through the other end of said cells.

In the practice of this invention, the multi-passaged, monolithic aluminum honeycomb is formed into a durable, strong catalytic substrate without the necessity of applying a thick coating of alumina to the honeycomb core to strengthen the same. Instead, the aluminum honeycomb is reinforced by surrounding it with a tubular metal shell and fastening one or more metal rib support members to the shell and to the cellular honeycomb core, the support members being oriented so that they transversely intersect a plurality of the nodes of the cellular honeycomb core and so they do not obstruct a substantial area of the open ends of the core and do not materially diminish the inherent high geometric surface area to weight (or volume) ratio of the honeycomb per se.

In the accompanying drawing.

Figure 1:
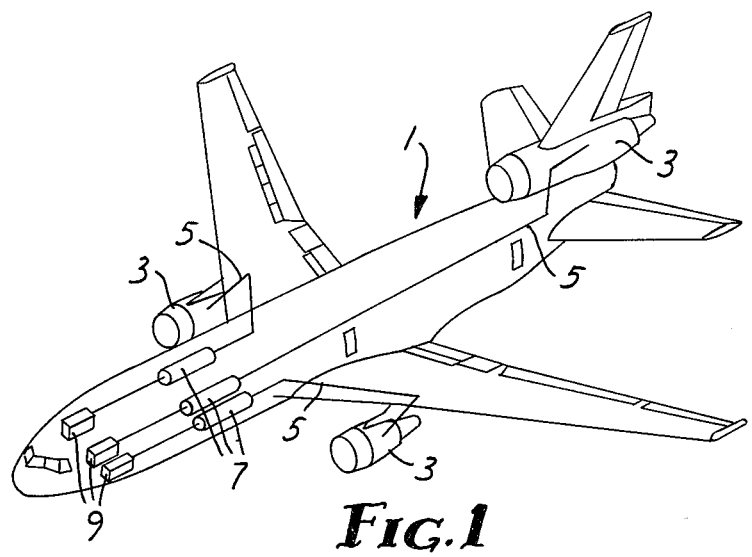
FIG. 1 is a perspective view of an aircraft equipped with deozonification equipment of this invention.

Referring to FIG. 1, it depicts a jet airplane 1 having jet engines 3 equipped with bleed lines 5 which remove bleed air from a compressor stage of each engine 3 and supply that air to one or more catalytic converters 7. Ozone is removed from the bleed air by converters 7, cooled by air conditioning units 9, and supplied to the cabin of aircraft 1.

Figure 2:
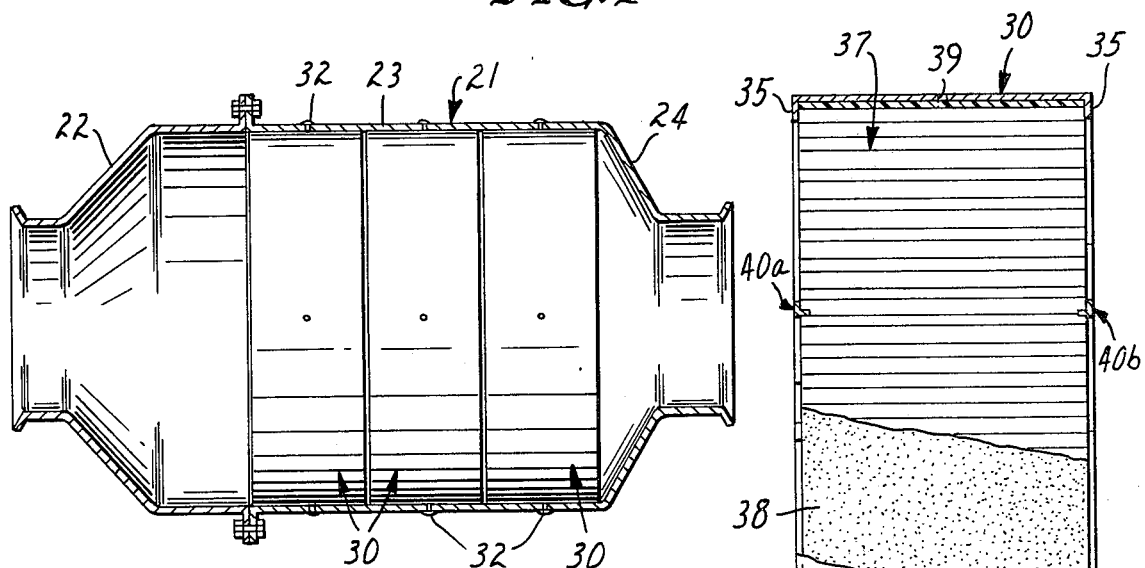
FIG. 2 is a longitudinal sectional view of a catalytic canister of this invention, containing a plurality of catalytic honeycomb structural units, which can be used as said deozonification equipment.

In FIG. 2, one embodiment of the catalytic converter 7 of FIG. 1 is shown and designated 21. Catalytic converter 21 has an inlet end through which a stream of ozone-laden air is passed, and an outlet end through which air with a reduced concentration of ozone is transmitted to the cabin of an aircraft. Converter 21 comprises a canister made up of a conical inlet member 22 and a tubular member 23 having conical outlet portion 24, members 22 and 23 being fastened together by mating flanges which can be unbolted to permit access to the interior of converter 21. Tubular member 23 contains a sufficient number of axially aligned, stationary catalytic cartridges 30 to obtain the desired reduction in concentration of ozone in the stream of ozone-laden air. The cartridges 30 are spaced apart in order to prevent fretting of one cartridge 30 against another and may be retained in place by suitable means such as rivets 32.

Figure 3:
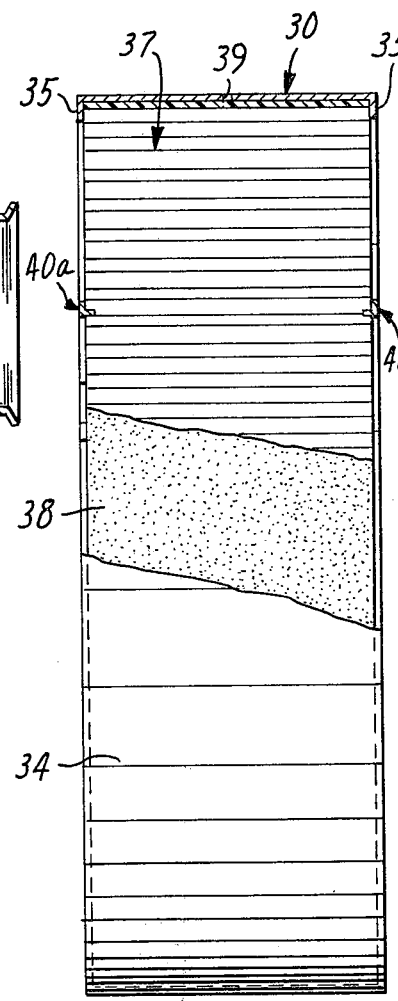
FIG. 3 is a sectional view of one of the catalytic honeycomb structural units of FIG. 2.

In FIG. 3 is shown a single catalytic cartridge 30 of FIG. 2. Tubular metal shell or hoop 34 has on each end an inwardly protruding flange 35, the shell and its flanges surrounding honeycomb core 37 to confine it and support it. Shell 34 is fastened to core 37 using an intermediate layer of adhesive 38 (see also FIG. 5). Rivet holes 39 are provided in shell 34 for mounting cartridge 30 in tubular member 23 of FIG. 2. Core 37 is supported and strengthened by metal rib supporting members 40a and 40b attached to end faces of core 37 and to flanges 35 of shell 34.

Figure 4:
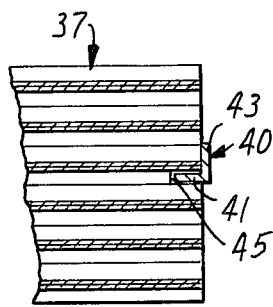
FIG. 4 is an enlarged view of a portion of FIG. 3.

In FIG. 4 is shown one means for attaching metal rib support member 40 to core 37. Rib 40 is L-shaped in cross-section and has exposed leg 43 and projecting leg 41. Projecting leg 42 is inserted into groove 45 in core 37.

Figure 5:
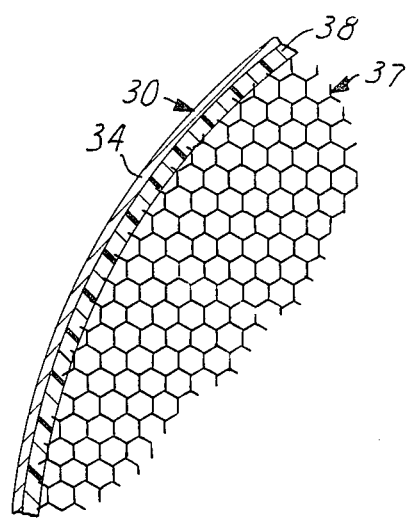
FIG. 5 is a sectional view of a portion of FIG. 3.

In FIG. 5 is shown one means for attaching a honeycomb core to metal shell 34. An adhesive 38 (e.g., one which is thermally stable at the temperatures required to deposit a catalytic coating upon core 37) is disposed between the outer wall of core 37 and the inner wall of shell 34.

Figure 6:
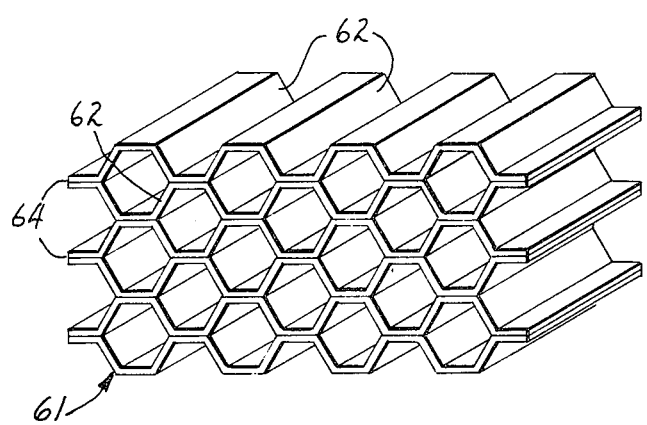
FIG. 6 is an isometric view of hexagonal aluminum honeycomb.

In FIG. 6 is shown an aluminum honeycomb core (with hexagonal cells). Aluminum honeycomb 61 is prepared by corrugating thin sheets 62 of aluminum and cementing them together with an organic adhesive at contiguous walls to form nodes 64. The resulting monolithic structure has a plurality of longitudinally aligned, regularly repeating hexagonal cells, a high surface area to weight (or volume) ratio, and light weight. The dimensions of honeycomb core 61 can be identified by reference to the ends or faces of the hexagonal cells and to the sheets or ribbons 62. The "thickness" of the core can be determined by measuring the length of a cell. The configuration of a honeycomb core may also be identified by reference to the thickness of the individual aluminum sheets, the aluminum alloy from which the sheets are made, and the "nominal cell size" (the average diameter across the face of an individual cell, measured from a cell wall to the opposing cell wall).

Figure 7:
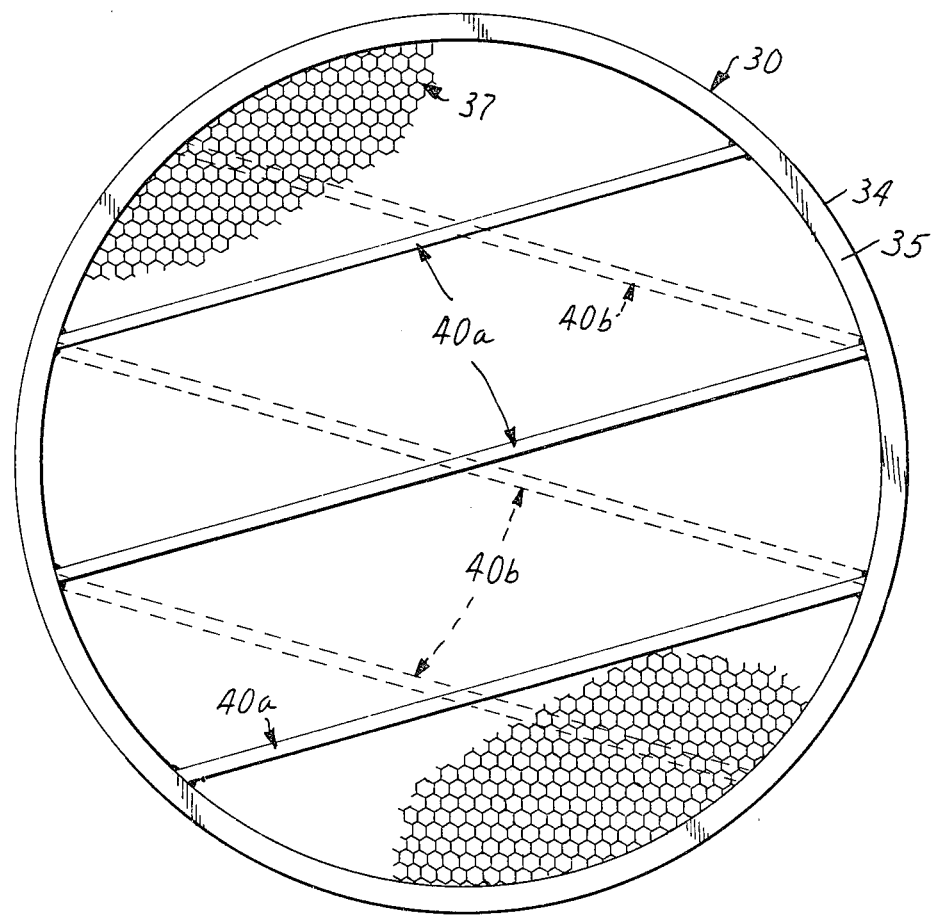
FIG. 7 is an end view of FIG. 3.

Referring to FIG. 7, support members 40a and 40b are shown attached to flanges 35 of shell 34 and to the ends of core 37, support members 40a being attached to one end of core 37 and support members 40b (shown by broken lines) being attached to the other end of core 37. Support members 40a are parallel to one another in this embodiment and intersect the nodes of core 37 at an acute included angle of 55°. Support members 40b are also parallel to one another in this embodiment and intersect the nodes of core 37 at an acute included angle of 55°. However, each of support members 40a is skewed relative to each of support members 40b, that is, longitudinal planes drawn through support members 40a and 40b would intersect at an acute included angle (30° in this embodiment). Orienting the support members in this fashion minimizes or prevents delamination of the corrugated sheets at the cellular nodes during operation of the catalytic converter and provides for transverse intersection of a large number of such nodes with a limited number of support members, thus not materially detracting from the light weight and large open end area of the honeycomb core.

The catalytic converter can be prepared by first cutting a piece of aluminum honeycomb to the desired core shape. The thickness of an individual honeycomb core of this invention should be such as to ensure that turbulent air flow will be maintained throughout the honeycomb cells. Turbulent air flow promotes more efficient deozonification. Turbulent air flow can be preserved by obeying the relationship $$T < (0.115) D^2 \rho V \mu^{-1}$$

where:
T = honeycomb thickness (cm)
D = nominal diameter of honeycomb cells (cm)
$\rho$ = density of air (g/cm$^3$)
V = velocity of air (cm/sec)
$\mu$ = viscosity of air (gm/cm-sec)

In order to obtain the desired level of ozone reduction in the catalytic converter of this invention, it may be necessary to assemble or arrange a series of catalytic cartridges (each of which has a low enough thickness to preserve turbulent flow within the core of that cartridge) through which the ozone-laden air passes in succession.

The aluminum honeycomb used in this invention can be in various forms or shapes, such as coplanar corrugated sheets or as spirally-wound alternating flat and corrugated sheets with colinear cells (such as "Spiral-grid" honeycomb, commercially available from the Bloomingdale Products division of American Cyanamid Company—see their bulletin entitled "Aluminum Honeycomb Core Products"). The individual honeycomb cells may be, for example, hexagonal, triangular, rectangular, or sinusoidal in cross-section. Preferably the individual honeycomb cells have a 1.6 mm nominal cell size and a 25 micrometer sheet thickness in order to obtain a high geometric surface area to weight (or volume) ratio and good rigidity of the honeycomb core. Honeycomb in this nominal cell size and sheet thickness is commercially available in the form of coplanar corrugated sheets with hexagonal cells (see, e.g., Hexcel Corp. bulletin DS 2100, dated Mar. 15, 1977), and is preferred in this invention.

The tubular metal hoop or shell is formed around each honeycomb core section using conventional metal working techniques. The metals used for the shell (and rib supporting members) can be any metallic material commonly used in aircraft such as aluminum, titanium, or stainless steel. Preferably aluminum is used so that the shell and rib have a coefficient of thermal expansion similar to that of the honeycomb core. Metal rib supporting members are disposed across the ends of the honeycomb core section in the orientation described above and fastened to the tubular shell by welding or soldering. Alternatively, the metal rib support members can be oriented in like manner but placed intermediate the two end faces of the honeycomb core, that is, by assembling the shell and core and then piercing the shell and core with ribs which "skewer" the interior of the honeycomb core, providing support in essentially the same manner as ribs applied to the ends of the shell and honeycomb core. The ribs will then be fastened to the core by an interference fit between the ribs and the pierced cell walls. External rib support members (i.e., ribs applied to the end faces of the shell and core) are preferred because of ease of assembly. If external rib support members are used, the rib supporting members are fastened to the honeycomb core by forming a groove in the core and inserting a cooperating portion of the rib supporting member into the groove, forming a dado joint. The groove and cooperating portion of the rib should fit together with a mild interference fit. The rib supporting member may also be fastened to the honeycomb core using a flexible adhesive, e.g., silicone cement, but such adhesives will not withstand the high temperatures required for deposition of the catalyst upon the core and therefore these adhesives can only be applied after the aluminum honeycomb has been coated with catalyst. Preferably the rib supporting members are straight, thin, parallel ribs, but other supporting structures such as arcuate ribs or a gridwork or lattice of straight or arcuate ribs could be used. The rib supporting members should transversely intersect a plurality of nodes of the honeycomb core as described above. Preferably the supporting members are oriented so that they intersect the nodes at between plus or minus 30° from the perpendicular to the plane in which the node lies, in order to achieve maximum reinforcement. Also, the rib supporting members are preferably attached to each of the inlet and outlet ends of a honeycomb core section. And, if rib supporting members are attached to each of the ends of a honeycomb core section, then they should be "skewed" as described above, preferably at about 30°. Most preferably the supporting members are straight, thin ribs, applied to each end of the honeycomb core section, spaced apart by a distance less than or equal to the core thickness, L-shaped in cross-section, partially recessed below the surface of the honeycomb core section, oriented at plus or minus 30° from the perpendicular to the plane in which the transversely intersected nodes lie, ribs on each end of the honeycomb core section are parallel to ribs on the same end, and ribs on one end are skewed 30° relative to ribs on the opposing end of the honeycomb core section.

The assembled cartridge is then coated with a metal compound which can be reduced to a catalyst, such as a salt of nickel, platinum or palladium. The surface area of the honeycomb core can be increased by first immersing the cartridge in sodium hydroxide solution, withdrawing the cartridge after a few seconds, shaking the cartridge to remove excess liquid, and then drying the cartridge in an oven at about 250° C. for several hours. This treatment etches and oxidizes the surface of the aluminum honeycomb core. A catalytic coating can be applied by immersing the treated cartridge in a solution containing a salt of the desired catalytic metal (e.g., $Ni(NO_3)_2$, $H_2PtCl_6$, or $PdCl_2$), removing the cartridge, shaking it to remove excess liquid, and drying the cartridge in an oven to reduce the metallic compound. Deposition of metallic catalyst from some salt solutions (e.g., $Ni(NO_3)_2$) will require the use of a stream of hydrogen gas in the drying oven in order to promote reduction, while deposition of metallic catalyst from other salt solutions (e.g., $H_2PtCl_6$ or $PdCl_2$) takes place in an air-filled drying oven without the use of hydrogen gas. During the catalyst deposition process the organic adhesive commonly used to form node-to-node bonds between contiguous sheets of aluminum honeycomb degrades or decomposes, and may leave a carbonaceous residue.

The catalytic cartridge or cartridges prepared as described above are mounted in a suitable canister made of, e.g., stainless steel or titanium, such as described in FIG. 2. The catalytic converter can then be mounted with suitable straps or clamps in an aircraft equipped with suitable manifolding and a bleed air supply.

In operation, the catalytic substrate will generally reach a temperature of about 120° C. to 260° C. The individual honeycomb cells are held together by any carbonaceous residue left from the decomposed honeycomb node-to-node adhesive, the cementing effect of the metallic catalyst, the tubular shell, and the reinforcing effect of the rib supporting members. A catalytic converter prepared according to the present invention will have resistance to high air flow rates, vibration, and impacts from foreign objects in the airstream, yet exhibit light weight, low pressure drop, even temperature distribution, and useful life.

The following examples are offered to aid understanding of the present invention and are not to be construed as limiting the scope thereof.

EXAMPLE 1

A cylindrical catalytic core 2.54 cm in diameter × 7.6 cm in thickness was prepared from aluminum honeycomb made from 5052 aluminum alloy with hexagonal cells of 1.6 mm nominal diameter and 25 μm sheet thickness, commercially available from Hexcel. The core was tested for ozone decomposition efficiency without encasing the core in a tubular shell or rib supporting members.

The core was immersed in 25% NaOH solution and moved up and down in the solution for several seconds in order to dislodge air bubbles on the surface of the core. The core was withdrawn from the solution, excess liquid was shaken off, and the core allowed to dry in air for a few seconds, followed by drying in an oven for one hour at 250° C., washing with distilled water, and redrying at 400° C. for 2 hours.

The core was then immersed in a 15% $Ni(NO_3)_2$ solution, moved up and down in the solution in order to dislodge air bubbles on the surface of the core, and allowed to remain in the solution for one minute. The core was withdrawn from the solution and heated in a tube furnace to a peak temperature of 400° C. in a hydrogen gas stream flowing at 150 ml/min at one atmosphere for 2 hours. A total of about 0.01 g of nickel was deposited on the core.

The nickel coated catalytic core was tested for ozone decomposition efficiency by placing it in a 7.1 liter/sec air stream containing 3 ppm $O_3$, at 177° C. and 1 atm. The catalytic core initially removed 74% of the ozone and removed 70% of the ozone after 24 hours of operation, as measured using a "Mast 724-6" ozone meter, commercially available from Mast Development Co.

Pressure drop across the catalytic core was 7.6 cm H₂O. The catalytic core weighed about 4.60 g.

In a comparison run, a conventional corrugated cylindrical ceramic honeycomb core ("AlSiMag 795" manufactured by 3M) 2.54 cm in diameter×7.6 cm in length with sinusoidal cells of dimensions 1.6 mm×3.2 mm×7.6 cm was immersed in a 10% solution of alumina ("DISPAL M", commercially available from Continental Oil Co.), removed, and dried at 550° C. for 3 hours. This resulted in the deposition of about 0.36 g of active alumina on the ceramic core. The ceramic core was immersed in a 15% solution of $Ni(NO_3)_2$, moved up and down in the solution for several seconds in order to dislodge air bubbles on the surface of the ceramic core, and allowed to remain in the solution for 2 minutes. The ceramic core was withdrawn from the solution, predried in a microwave oven for 2 minutes, and heated in a tube furnace at 420° C. in a hydrogen gas stream flowing at 150 ml/min at one atmosphere for 2 hours. About 0.09 g of nickel was deposited on the ceramic core. This ceramic catalytic core was tested for ozone decomposition efficiency under the same conditions as used to test the aluminum catalytic core. The ceramic catalytic core initially removed only 57% of the ozone and removed 48% of the ozone after 24 hours of operation. Pressure drop across the ceramic catalytic core was 11.6 cm H₂O. The ceramic catalytic core weighed 19.89 g.

This example demonstrated that a catalytic core made of aluminum exhibited 30% better initial ozone decomposition, 66% lower decrease in ozone decomposition efficiency after 24 hours, 34% lower pressure drop, and 77% lighter weight than a catalytic core made of ceramic with identical external dimensions.

EXAMPLE 2

An aluminum honeycomb core of the same material as the core used in Example 1 was treated with 13% NaOH solution as described in Example 1. The core was wetted with 4% $NaHCO_3$ solution and dried in an oven at 120° C. for 30 minutes.

A mixture of 2.04 g NaCl and 62 ml of 5% $PdCl_2$ solution was slowly evaporated (over an electric hot plate) to form $Na_2PdCl_4$. The resulting compound was mixed into water at 50° C. to form 150 ml of solution. The treated aluminum core was immersed in the solution, moved up and down in the solution for several seconds to dislodge air bubbles from the core, and withdrawn before a vigorous reaction took place. The core was immersed in a 4% solution of HCOONa at 50° C. for 30 minutes, washed in deionized water heated to 50° C., and dried in air at 120° C. for 8 hours.

The palladium-coated aluminum catalytic core was tested for ozone decomposition efficiency using the method of Example 1. The catalytic core initially removed 63% of the ozone.

EXAMPLE 3

A cylindrical honeycomb core 2.54 cm in diameter×11 cm in thickness was prepared from spirally-wound aluminum honeycomb with colinear sinusoidal cells of 1.6 mm×6.3 mm, commercially available from the Bloomingdale Products Division of American Cyanamid Company. A nickel catalytic coating was deposited upon the surface of the honeycomb core using the procedure described in Example 1. The nickel coated catalytic core was tested for ozone decomposition efficiency using the procedure described in Example 1. The catalytic core removed 86% of the ozone for 43 hours without a decrease in efficiency. Pressure drop across the catalytic core was 14.5 cm H₂O.

EXAMPLE 4

A catalytic cartridge for a catalytic converter such as depicted in FIGS. 2 to 7 was made and tested as follows. A cylindrical catalytic core 24.0 cm in diameter and 7.5 cm in thickness was prepared from aluminum honeycomb as described in Example 1. Three parallel slots 1 mm deep and spaced 6 cm apart were cut in each end of the catalytic core. The slots were oriented to trasversely intersect the honeycomb nodes at ±15° relative to the perpendicular through the plane in which a node lies, with slots on opposite sides of the catalytic core skewed 30° relative to one another. The inside rim of the cylindrical core was coated with ceramic cement ("Sauereisen Insa-Lute No. 1", commercially available from Sauereisen Cements Co.). A metal shell was prepared by forming two 0.6 cm flanges along the long edges of a piece of 6061 T6 aluminum 8.9 cm in width×75.8 cm in length, rolling the resulting formed aluminum strip into a hoop shape using a die, cutting the hoop into two semi-circular halves, placing the halves around the catalytic core, and heliarcing the mating edges of the halves together. The welds were ground flat.

Support members were prepared by bending a strip of 1 mm thick 6061 T6 aluminum 19.8 mm in width to form a rib with an L-shaped cross section, one leg of the "L" being 3.1 mm in width and the other leg of the "L" being 18.4 mm in width. The rib was cut into six lengths matching the lengths of the exposed slots in each end of the catalytic core. The long leg of each rib was inserted into an exposed slot and the ends of the ribs were heliarced to the metal shell. The catalytic cartridge was coated with metallic nickel as described in Example 1.

The catalytic cartridge was then tested for resistance to high air flow by subjecting it to a high pressure air blast from a hand held air nozzle. Up to an air velocity of 48,000 cm/sec, the catalytic core showed no change. Above that velocity some vibration of the cell walls could be discerned. At an air velocity of 58,400 cm/sec, a few 2.5 cm long delamination seams had appeared between adjacent foil layers. The delamination seams did not penetrate the full thickness of the catalytic core. Damage was confined to the area where air pressure had been applied. The majority of the cells within the catalytic core remained intact and useful for deozonification.

In a comparison run, a catalytic cartridge was prepared as described above but no slots or ribs were installed. The core was tested for resistance to air flow as described above. At an air velocity of 39,300 cm/sec, vibration of the cell walls was discernable. As the air velocity was increased, delamination of the catalytic core occurred at lower pressures with formation of deeper and longer delamination seams than for the rib-supported catalytic core. At an air velocity of 58,400 cm/sec, seams of up to 18 cm in length had appeared between adjacent foil layers and most of the foil layers of the catalytic core had become delaminated from one another. The delamination seams penetrated the full thickness of the catalytic core. Damage extended well beyond the immediate area in which air pressure had been applied. The catalytic cartridge was essentially no longer useful for deozonification.

Various modifications and alterations of this invention will be apparent to those skilled in the art without departing from the scope and spirit of this invention and the latter should not be restricted to that set forth herein for illustrative purposes.

What is claimed is:

1. A cartridge for a catalytic ozone converter, said cartridge comprising:
    (a) an aluminum honeycomb core consisting essentially of a plurality of corrugated aluminum sheets bonded together at their contiguous points of contact to define a plurality of longitudinally aligned, thin-walled passages in the form of regularly repeating cells of such dimensions as to ensure turbulent flow of air therethrough, and with the nodes of said cells being the loci of said contiguous points of contact;
    (b) a tubular metal shell surrounding the outer wall of said core and affixed thereto;
    (c) one or more metal rib support members each fastened at its two ends to said shell and fastened along its length to said core so as to transversely intersect a plurality of said nodes; and
    (d) a catalytic material deposited on the walls of said cells to form a catalytic surface for reaction with fluid passing through said core.

2. An article according to claim 1, wherein a first set of straight, parallel-aligned, spaced-apart metal rib support members is fastened to the inlet face of said core and a second set of straight, parallel-aligned, spaced-apart metal rib support members is fastened to the outlet face of said core.

3. An article according to claim 2 wherein said first set of metal rib support members are skewed relative to said second set of metal rib support members.

4. An article according to claim 2 wherein said first and second sets of metal rib support members are spaced apart from other of said rib support members on the same end of said core by a distance less than or equal to the thickness of said core.

5. An article according to claim 2 wherein said metal rib support members are at least partially recessed below the adjacent end surface of said core.

6. An article according to claim 2 wherein said catalytic material is a metal selected from the group consisting of nickel, platinum, and palladium.

7. An article according to claim 2 wherein said corrugated sheets are coplanar and said cells are hexagonal in cross-section.

8. An article according to claim 2 wherein the thickness of said core is less than $(0.115) D^2 \rho V \mu^{-1}$, wherein D is the nominal diameter in cm of said cells, $\rho$ is the density in g/cm$^3$ of said fluid, V is the velocity in cm/sec of said fluid passing, and $\mu$ is the velocity in g/(cm)(sec) of said fluid.

9. A cartridge for a catalytic converter, said cartridge comprising:
    (a) an aluminum honeycomb core consisting essentially of a plurality of corrugated aluminum sheets bonded together at their contiguous points of contact to define a plurality of longitudinally aligned, thin-walled passages in the form of regularly repeating cells of such dimensions as to ensure turbulent flow of air therethrough, and with the nodes of said cells being the loci of said contiguous points of contact;
    (b) a tubular metal shell surrounding the outer wall of said core and affixed thereto;
    (c) one or more rib support members each fastened at its two ends to said shell and fastened along its length to said core so as to transversely intersect a plurality of said nodes, wherein a first set of straight, parallel-aligned, metal rib support members is fastened to the inlet face of said core and spaced apart by a distance less than or equal to the thickness of said core, a second set of straight, parallel-aligned, metal rib support members is fastened to the outlet face of said core and spaced apart by a distance less than or equal to the thickness of said core, said support members are L-shaped in cross-section, at least partially recessed below the adjacent surface of said core, oriented at between plus and minus 30° from a perpendicular to the planes in which said transversely intersected nodes lie, and said support members fastened to said inlet end are skewed relative to said support members fastened to said outlet end; and
    (d) a catalytic material selected from the group consisting of nickel, platinum, and palladium, deposited on the walls of said cells to form a catalytic surface for reaction with ozone-laden air passing through said core.

10. An aluminum honeycomb structural unit useful as a catalytic substrate, comprising:
    (a) an aluminum honeycomb core consisting essentially of a plurality of corrugated aluminum sheets bonded together at their contiguous points of contact to define a plurality of longitudinally aligned, thin-walled passages in the form of regularly repeating cells of such dimensions as to ensure turbulent flow of air therethrough, and with the nodes of said cells being the loci of said contiguous points of contact;
    (b) a tubular metal shell surrounding the outer wall of said core and affixed thereto; and
    (c) one or more metal rib support members each fastened at its two ends to said shell and fastened along its length to said core so as to transversely intersect a plurality of said nodes.

11. A catalytic converter, comprising:
    (a) a tubular canister having an inlet and an outlet end;
    (b) one or more of the structural units of claim 10 disposed within said canister, wherein said cell walls have been coated with a catalytic material to form a catalytic surface for reaction with fluid passing through said core.

12. A cartridge for a catalytic ozone converter, said cartridge comprising:
    (a) an aluminum honeycomb core consisting essentially of a plurality of corrugated aluminum sheets bonded together at their contiguous points of contact to define a plurality of longitudinally aligned, thin-walled passages in the form of regularly repeating cells of such dimensions as to ensure turbulent flow of air therethrough, and with the nodes of said cells being the loci of said contiguous points of contact;
    (b) a tubular metal shell surrounding the outer wall of said core and affixed thereto;
    (c) a first set of straight, parallel-aligned, spaced-apart metal rib support members each fastened at its two ends to said shell and fastened along its length to the inlet face of said core so as to transversely intersect a plurality of said nodes, and a second set of straight, parallel-aligned, spaced-apart metal rib support members each fastened at its two ends to said shell and fastened along its length to the outlet face of said core so as to transversely intersect a plurality of said nodes, with said metal rib support members being oriented at between plus or minus 30° from a perpendicular to the planes in which said transversely intersected nodes lie; and (d) a catalytic material deposited on the walls of said cells to form a catalytic surface for reaction with fluid passing through said core.

13. A cartridge for a catalytic ozone converter, said cartridge comprising:

(a) an aluminum honeycomb core consisting essentially of a plurality of corrugated aluminum sheets bonded together at their contiguous points of contact to define a plurality of longitudinally aligned, thin-walled passages in the form of regularly repeating cells of such dimensions as to ensure turbulent flow of air therethrough, and with the nodes of said cells being the loci of said contiguous points of contact;

(b) a tubular metal shell surrounding the outer wall of said core and affixed thereto;

(c) a first set of straight, parallel-aligned, spaced-apart metal rib support members each fastened at its two ends to said shell and fastened along its length to the inlet face of said core so as to transversely intersect a plurality of said nodes, and a second set of straight, parallel-aligned, spaced-apart metal rib support memebers each fastened at its two ends to said shell and fastened along its length to said core so as to transversely intersect a plurality of said nodes, wherein said metal rib support memebers have an L-shaped cross-section; and (d) a catalytic material deposited on the walls of said cells to form a catalytic surface for reaction with fluid passing through said core.

* * * * *

UNITED STATES PATENT AND TRADEMARK OFFICE
CERTIFICATE OF CORRECTION

PATENT NO. : 4,348,360
DATED : September 7, 1982
INVENTOR(S) : Jeffrey C. Chang and Arthur W. Pluim, Jr.

It is certified that error appears in the above—identified patent and that said Letters Patent is hereby corrected as shown below:

Col. 8, line 13: "trasversely" should read --transversely--.

Col. 12, line 11: "memebers" should read --members--.

Col. 12, line 14: "memebers" should read --members--.

Signed and Sealed this

Third Day of May 1983

[SEAL]

Attest:

GERALD J. MOSSINGHOFF

Attesting Officer

Commissioner of Patents and Trademarks